March 23, 1965　　　H. FRENK　　　3,175,128

SWITCHING ARRANGEMENT FOR ELECTROMAGNETS

Filed March 8, 1961　　　4 Sheets-Sheet 1

INVENTOR:
HELMUTH FRENK

By *Toulmin & Toulmin*

Attorneys

INVENTOR:
HELMUTH FRENK

By Toulmin & Toulmin
Attorneys

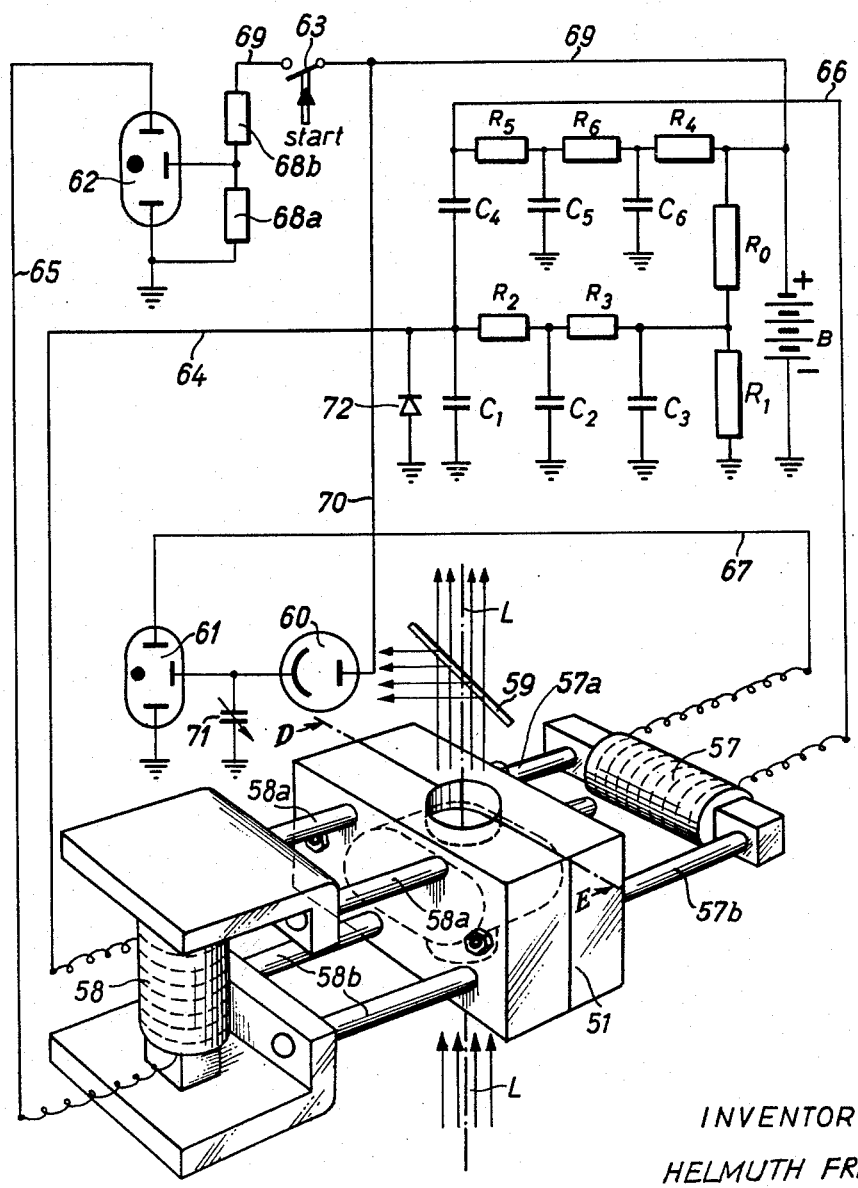

March 23, 1965  H. FRENK  3,175,128
SWITCHING ARRANGEMENT FOR ELECTROMAGNETS
Filed March 8, 1961  4 Sheets-Sheet 4

INVENTOR:
HELMUTH FRENK
By Toulmin & Toulmin
Attorneys 3,175,128
SWITCHING ARRANGEMENT FOR
ELECTROMAGNETS
Helmuth Frenk, Wetzlar (Lahn), Germany, assignor to
Ernst Leitz Gesellschaft mit beschrankter Haftung,
Wetzlar (Lahn), Germany
Filed Mar. 8, 1961, Ser. No. 94,365
Claims priority, application Germany, Mar. 19, 1960,
L 35,676
9 Claims. (Cl. 317—123)

The present invention relates to a switching arrangement for electromagnets, more particularly, to alternatingly operable electromagnets where the operation of one electromagnet precludes the operation of the second electromagnet so that when one electromagnet is energized the second electromagnet cannot be energized.

The use of switching arrangements for electromagnets has been employed in many different fields, such as in step-motors and actuation of shutters in cameras by the use of electromagnets. In the actuation of camera shutters two electromagnets are provided the fields of which are at substantially right angles. One of the known shutters is so positioned that the blades comprising the shutter act as an armature of an electromagnet. When one electromagnet is energized the shutter blades will align in such a way so as to form minimum air-gaps between the poles of this electromagnet. In this position the shutters will be closed and no light will be transmitted therethrough. When the second electromagnet is energized, the shutter blades will pivot 90° so as to form minimum air-gaps between the poles of the second electromagnet. In general, the second electromagnet is provided with pairs of poles which correspond to the number of the shutter blades.

In one known switching arrangement, storage capacitors have been connected in parallel to the magnetic coils. Accordingly, when the coils are first energized they are provided with a surge of current which is sufficient to move the shutter blades. This current reduces after the discharge of the capacitor so that the weakened current remaining is sufficient only to hold the shutter blades in their final positions. In essence, the discharge circuits of these capacitors comprise a highly attenuated oscillatory circuit. When small magnetic coils are used, the R–L time constant, whose formula is $L/R=t$, is a rather small one. As an approximation it can be assumed that the discharge of the capacitor will occur as if only the ohmic resistance were present in the circuit and the inductance L is equal to 0. As a result, the time constant of the discharge circuit is determined only by the ohmic resistance R and the capacitance C of the capacitor.

If the RC time constant, whose formula is $R \cdot C=t$, is so small that the capacitor is completely discharged each time the shutter blades are moved to a new position, the blades will swing past their determined end positions. In the event mechanical stops or abutments are provided to limit the pivoting movement of the shutter blades, the blades will hit the stops with such an impact because of their kinetic energy that they will oscillate several times before coming to a stop. It is readily apparent that if this occurs in a photographic shutter there will be an intermittent transmission of light. Therefore, in order to eliminate these oscillations of the shutter blades the time constant has to be sufficiently high so as to retain the shutter blades in the determined end position by a sufficient strength of the magnetic field until the tendency for the blades to mechanically oscillate has been dispersed. Only after this tendency has been eliminated is it possible to again move the shutter blades to a new position. As a result, it is not possible to obtain very short closure times for the shutter blades. Further, in those cameras where the exposure time is automatically regulated there is always the possibility that the second magnetic field is energized too early so that the intensity of of the second magnetic field is not sufficient to overcome the strength of the decayed first magnetic field and accordingly the shutter blades will not move to their new position.

It is further pointed out that the presence of the relatively high current in the magnetic coil circuit will cause an arcing when the first magnetic circuit is opened. As a result, a residual intensity of the magnetic field will remain that will be sufficient for holding the shutter blades in the opened position. This means that in a photographic shutter the shutter will remain open even though automatic regulation of the exposure time has energized the second circuit to close the shutter blades.

It is therefore apparent that the problem is to connect the magnetic coils in such an electrical circuit so that by energizing the second coil the first coil will necessarily remain without electrical current. This is accomplished in the present invention by interconnecting the magnetic coils by capacitors in such a way that when the circuit of one magnetic coil is closed, the circuit of the magnetic coil which was previously energized is necessarily disconnected. It is desirable to provide a switching arrangement for such a circuit wherein a negative pulse is added to the circuit of the magnetic coil which has been previously energized, so that this pulse will effect an immediate collapse of the positive magnetic field. In the present invention this pulse is obtained by inserting an auxiliary capacitor between the ends of the magnetic coils. In addition, rectifiers are connected in parallel through their respective magnetic coils in order to prevent the creation of a negative magnetic field when the circuit is disconnected as well as the addition of a negative pulse.

A preferable arrangement is obtained when the storage capacitors for the magnetic coils are connected in series so that the capacitor that is to energize the magnetic coil which is to be initially connected in a circuit has a smaller charge than the capacitor which is to energize the magnetic coil which is to be subsequently connected in circuit. In this way, when the circuit of the second magnetic coil is connected to a source of electrical energy, the residual charge of the capacitor corresponding to the first magnetic coil is more rapidly exhausted than the charge of the capacitor corresponding to the second magnetic coil.

Since high capacitances are necessary in order to prevent a fluttering or oscillating of the shutter blades, a high strain will be imposed on the switching contacts in the circuits. It is therefore preferable to employ RC-chains instead of individual capacitors for generating the current for the magnetic coils. In these chains the individual capacity of each capacitor may be smaller than the capacitor of a single capacitor divided by the number of capacitors connected in the RC-chain. The capacitors in the RC-chain are interconnected by electrical resistances wherein each resistance is greater than the electrical resistance of the magnetic coil.

The particular advantage of the last-mentioned switching arrangement is that a sufficiently high current pulse of a shorter duration is generated for moving the shutter blades than is the case in an arrangement having individual capacitors, since the holding current at the end of the discharge period of the capacitors is stronger than in the case of an individual capacitor.

It is therefore the principal object of this invention to provide a novel and improved switching arrangement for a pair of alternatingly operating electromagnets.

Other objects and advantages of this invention will be apparent upon reference to the accompanying description when taken in conjunction with the following drawings, wherein FIGURE 1 is a schematic view showing the arrangement of the shutter blades and the electromagnets for actuating the blades;

FIGURE 6a is a schematic view showing components in the electrical circuit of a switching arrangement wherein RC-chains are provided for producing the current;

Figure 1:
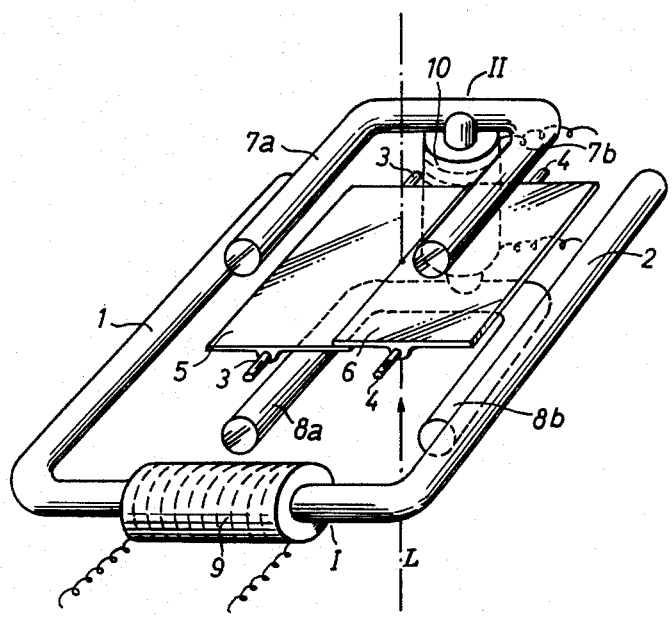

A description of the background of the structure wherein the present invention resides together with a description of specific embodiments of the present invention will next be described with reference to the drawings wherein like reference symbols indicate the same parts throughout the various views.

Returning to FIGURE 1, the two electromagnets are indicated at I and II. The electromagnet I comprises a pair of poles 1 and 2 between which are mounted shafts 3 and 4 upon which the shutter blades 5 and 6 are pivotally mounted. The shafts 3 and 4 are perpendicular to the direction of the light entering the camera and indicated at L. When the eletcromagnet I is connected in circuit and energized, the shutter blades will be aligned between the poles 1 and 2 as illustrated in FIGURE 1.

The electromagnet II comprises a first pair of poles 7a and 7b and a second pair of poles 8a and 8b. The pairs of poles are positioned at opposite sides of the shutter blades.

A magnetic coil 9 energizes the electromagnet I and a magnetic coil 10 energizes the electromagnet II.

When the electromagnet II is connected in circuit so as to be energized, the shutter blades 5 and 6 are pivoted from their positions as shown in FIGURE 1 so that they are positioned parallel to the direction of the magnetic field lines of the electromagnet II and parallel to the direction L of the light. It is necessary, however, that the electromagnet I be de-energized since otherwise the intensity of the magnetic field of the electromagnet II would not be sufficient to pivot the shutter blades from the position as shown in FIGURE 1. The shutter blades are of very light structure and accordingly very short opening and closing times can be obtained.

Figure 2:
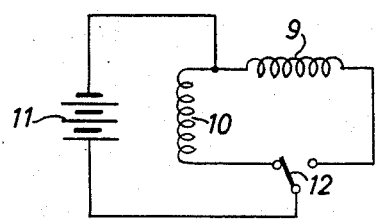
FIGURE 2 is a schematic electrical circuit diagram of the electromagnets illustrated in FIGURE 1.

Proceeding next to FIGURE 2 there is shown the circuit diagram employed for energizing the electromagnets I and II. The magnetic coils 9 and 10 are connected in parallel with each other in a circuit comprising a battery 11 and a reversing switch 12. When the coil 9 is connected across the battery 11 by the switch 12 the shutter blades 5 and 6 will be aligned as shown in FIGURE 1. When the coil 10 is connected across the battery 11 and the circuit comprising the coil 9 is opened, the blades 5 and 6 will be pivoted to positions vertical to those illustrated in FIGURE 1.

If it is desired to obtain a very short switching time, then very high currents will be necessary in order to pivot the shutter blades. This is necessary because of the large air-gaps which exist only at the beginning of the closing of the magnetic circuits. However, continuous operation of these circuits with high currents would cause the coils to burn out. For this reason it has been proposed to energize the magnetic coils by discharging capacitors so that the voltage provided by the capacitors is higher than that provided by the battery 11, as shown in FIGURE 2.

Figure 3:
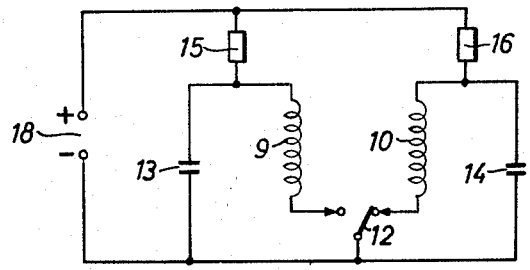
FIGURE 3 is a circuit diagram similar to that of FIGURE 2 but showing storage capacitors in parallel with the magnetic coils.

Proceeding next to FIGURE 3 there is shown a circuit diagram wherein capacitors are used. In this circuit storage capacitors 13 and 14 are connected in the circuit in parallel with respect to the magnetic coils 9 and 10, respectively. The capacitors are charged through resistances 15 and 16, respectively, through a source of electrical energy 18.

When the reversing switch is manipulated to connect a coil across the current source, that magnetic coil will first be supplied with a high current which will be sufficient to pivot the shutter blades. After the capacitor has been discharged only a weakened current will continue to flow through the magnetic coil. The intensity of this current will be determined by the size of the electrical resistances 15 and 16, respectively.

Figure 4:
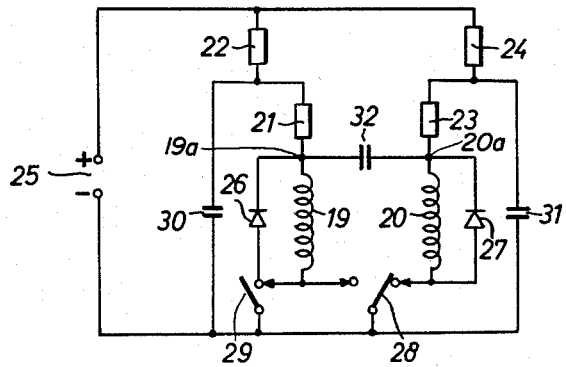
FIGURE 4 is a schematic electrical circuit diagram of a switching arrangement having an auxiliary capacitor inserted between the magnetic coils.

Proceeding next to FIGURE 4 there is shown an auxiliary capacitor inserted between the magnetic coils. This capacitor comprises magnetic coils 19 and 20 which are connected through electrical resistances 21, 22 and 23, 24, respectively to a source of electric current 25. Rectifiers, which may be diodes 26 and 27, respectively, are connected in parallel with the magnetic coils 19 and 20. Capacitors 30 and 31 are provided for generating a high current pulse when the magnetic coils are connected across the electrical source by reversing switches 28 or 29. There is an auxiliary capacitor 32 connected between the magnetic coils 19 and 20 at respective junctions 19a and 20a.

In the operation of the switching arrangement of FIGURE 4 closing of the reversing unit 28 will cause a strong current to flow through the magnetic coil 20 by means of the discharge of the capacitor 31. This current will slowly reduce as the capacitor proceeds to discharge until only the holding current resulting from the electrical resistance of the magnetic coil 20 itself and its resistors 23 and 24 flows through the coil.

In the operating position shown in FIG. 4, there is a voltage across charged capacitor 32 equal to the voltage drop across resistors 23, 24. When now switch 29 is closed, capacitor 30 discharges rapidly through resistor 21 and coil 19, also rapidly reducing the potential at the common junction 19a of resistor 21, coil 19 and capacitor 32; this in turn will reduce the potential of the common junction 20a of resistor 23, coil 20 and capacitor 32. Since capacitor 32 is still charged or not completely discharged, the potential at junction 20a will decrease to the potential level of the negative voltage terminal prevailing also at the junction of switch 28 and coil 20. The voltage across coil 20, however, will not be reversed since rectifier 27 limits the potential at junction 20a to that of the junction of elements 28, 20. Accordingly, the voltage for and across coil 20 is positively reduced to zero at the moment of energization of coil 19. Now switch 28 can be reversed without arcing; switch 28 has to be opened before capacitor 32 has discharged, i.e. before the potential at junction 20a is going positive again.

The capacitor 32 is interposed between the magnet coils 19 and 20 which causes the magnetic field in the last energized magnet to die down quickly when the current is switched over from that magnet to another one. This effect is produced by the effort of the capacitor at the time when the current is switched over to the second magnet to deliver a current impulse to the coil of the first magnet in a direction that would tend to create a magnetic field opposite to that which was previously in the first coil and which would oppose the former magnetic field.

Figure 5:
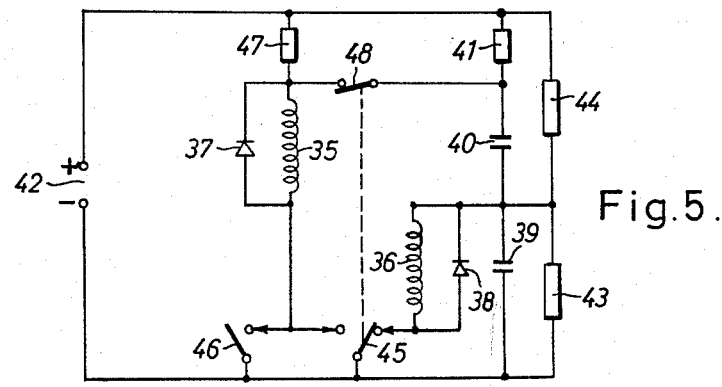
FIGURE 5 is an electrical circuit diagram of a switching arrangement wherein the capacitors producing the current for the magnetic coils are connected in series.

In the electrical circuit of FIGURE 5 a magnetic coil 36 is provided which may be used for opening a photographic shutter and a magnetic coil 35 is used for closing the shutter. Rectifiers 37 and 38 are connected in parallel to these magnetic coils. There are capacitors 39 and 40 connected in series with a resistance 41 to the two sides of an electrical current source 42. A pair of resistors 43 and 44 form a voltage divider and are connected in parallel to the capacitors 39 and 40 and the resistance 41. The magnetic coil 36 and the rectifier 38 are connected through a reversing switch 45 in parallel to the capacitor 39.

The coil 35 and the rectifier 37 are connected in parallel across the capacitors 39 and 40 through switches 46 and 48. A resistor 47 is connected in series with the coil 35 and to the source of electrical energy 42.

In the operation of this circuit, when the magnetic coil 36 is connected across the source electrically by the reversing switch 45, the capacitor 39 is discharged and produces a current for opening the shutter blades. When the exposure time has been terminated, the switch or contactor 46 is closed and both of the capacitors 39 and 40 will be discharged through the coil 35. These two capacitors or the voltage divider 43, 44 are of such electrical quantities that the capacitor 39 is discharged at a faster rate than the capacitor 40. Accordingly, the shutter blades will remain closed by the residual charge produced by the capacitor 40. In addition, the rectifier 38 will prevent the magnetic coil 36 from producing a negative current. Switch 48 is simultaneously opened with the reversing of switch 45 and permits a slow recharging of capacitor 40 through the resistance 41 alone when coil 35 is being energized through resistor 47 alone.

In the circuit of FIGURE 5, the time constants of the discharges of the capacitors 39 and 40 are sufficiently great so as to prevent the shutter blades from oscillating in their end positions. These relatively large time constants, however, require capacitors of large capacitance which, in turn, exert a strain at the contacts of the reverse switches 45 and 46 by the electrical arcs generated.

The ideal quantities of electrical current for actuating the magnetic coils can be more accurately obtained by providing an RC-chain for the coils instead of a single RC element. If the two capacitors 39 and 40 are replaced, for example, by three smaller capacitors, each of which has a capacitance of less than one third of the capacitance of the capacitors 39 and 40, and are connected through resistances which are greater than the electrical resistance of the respective coil, the first current pulse for initiating the movement of the shutter blades will be as great as can be obtained by a single capacitor. However, the intensity of the current for avoiding oscillation of the blades after movement to their final positions is greater than can be obtained through a single capacitor. The holding current for retaining the blades in the final positions can be again determined by the resistor 47.

Figure 6B:
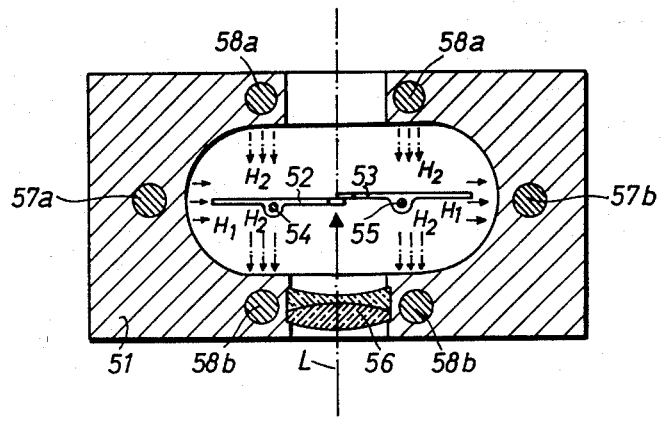
FIGURE 6b is a sectional view, taken along the line D–E of FIGURE 6a and showing the structure of the shutter.
Figure 6C:
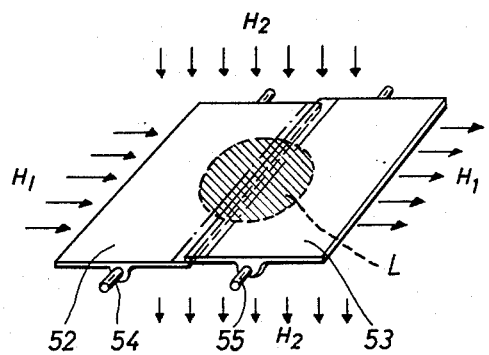
FIGURE 6c is an overall perspective view of the shutter blades and illustrating the directions of the magnetic fields acting upon the blades.

Proceeding next to FIGURES 6a through 6c there is shown a switching arrangement wherein electronic switches are employed and the exposure time of the camera is automatically regulated. A shutter member 51 is positioned in the path of the incoming light rays and comprises a pair of shutter blades 52 and 53 which are pivotally mounted, such as louvers, upon the shafts 54 and 55. The shutter member 51 also functions as a support for an optical system 56 for use in forming the image. The movement of the shutter blades 52 and 53 is accomplished by two electromagnetic systems 57 and 58. These electromagnetic systems respectively comprise poles 57a, 57b and 58a, 58b which are arranged as close as possible to the path of movement of the shutter blades 52 and 53.

Energization of the electromagnet 58, which opens the blades, produces a magnetic field $H_2$ between the poles 58a and 58b to pivot the shutter blades in the open position and thereby permit the light rays L to be received within the camera. Energization of the closing electromagnet 57 creates a magnetic field $H_1$ between the poles 57a and 57b to pivot the shutter blades into a closed position. Thus the shutter blades 52 and 53 are essentially the armatures of the electromagnetic systems 57 and 58.

The structure of FIGURES 6a to 6c can be used to obtain an automatic regulation of the exposure time in a photographic apparatus. In this application a beam-splitting element 59, which also may be a prism, is mounted behind the shutter structure 51 as seen in the direction of the light received by the shutter apparatus. Beam-splitter 59 directs a portion of the light received through the shutter to a photoelectric cell 60 which is connected to an electronic thyratron contactor 61 actuated for closing the shutter. A second thyratron 62 is connected to a mechanical contactor switch 63 for starting the entire exposure process.

The thyratron 62 functions as a circuit closer and as a circuit breaker of the electromagnetic system 58 and is connected with a source of direct current B by an electrical lead 64 and also connected to the magnetic coil of the electromagnetic system 58 by the electrical lead 65.

The thyratron 61 which functions as the circuit closer and circuit breaker of the electromagnetic system 57 is connected with a source of direct current B through voltage divider $R_1$, $R_0$ by means of the electrical lead 66 and is connected to the magnetic coil of the electromagnetic system 57 by an electrical lead 67.

The control grid of the thyratron 62 is connected between the voltage divider 68a, 68b and is connected to the source of direct current B through an electrical lead 69 within which is connected to the mechanical contactor switch 63.

The control grid of the thyratron 61 is connected to the source of direct current B through the photoelectric cell 60 and through the electrical leads 70 and 69. In order to allow for an adaptation of the exposure time to the different sensitivities of the photographic material, an adjustable capacitor 71 is connected in parallel to the grid-cathode circuit of the thyratron 61.

There is an RC-chain formed by the capacitors $C_1$, $C_2$, $C_3$ which capacitors are connected by the resistances $R_2$ and $R_3$. This RC-chain generates the current for actuating the magnetic coil of the opening electromagnetic circuit 58. The capacitors are charged through the voltage divider $R_0$, $R_1$. The capacitances of the capacitors and the resistances of the resistors are so chosen that the time constants $R_1.C_2$ and $R_3.C_3$ are of the same or a higher magnitude than the time constant obtained by multiplying the capacitance $C_1$ by the resistance of the magnet coil of the electromagnetic circuit 58.

The second RC-chain is formed by the capacitors $C_4$, $C_5$, $C_6$ which are connected by the resistance $R_5$ and $R_6$. This RC-chain provides the exciting current for the actuation of the electromagnetic circuit 57. These capacitors are charged through a resistor $R_4$. The time constants of this RC-chain have the same relationship to each other as the time constant set forth for the above-mentioned RC-chain. The capacitor $C_4$ is connected in series with the capacitor $C_1$. It is pointed out that the electrical resistances of the voltage divider $R_0$, $R_1$ and the capacitances of the capacitors $C_1$ through $C_6$ are so chosen that the total charge of the capacitor $C_4$ is greater than that of the capacitor $C_1$ and the total of the charges of the capacitors $C_4$, $C_5$ and $C_6$ is greater than the total of the charges of $C_1$, $C_2$ and $C_3$. A diode 72 is connected in parallel with the capacitor $C_1$ to permit $C_1$ to be charged normally and to prevent a charge of the reversed polarity.

When the opening electromagnetic circuit 58 is connected to a source of electrical energy by closing the starting mechanical contactor 63, the circuit is energized to fire the thyratron 62. The RC-chain $C_1$, $R_2$, $C_2$, $R_3$ and $C_3$ then starts to discharge and the capacitors $C_2$ and $C_3$ must supply a sufficient holding current to prevent the shutter blades from fluttering or oscillating after they have reached their end positions. A voltage corresponding to approximately the operating voltage of the thyratron 62 then remains at the capacitor $C_1$. When the thyratron 61 is subsequently fired by a photoelectric cell 60, the closing electromagnetic circuit 57 is then energized. Since at this time the opening electromagnetic circuit 58 will contain current that may be quite high when short exposure times are involved, it may not be possible at this time to close the shutter blades. As a result of the series-conenction of the capacitors $C_1$ and $C_2$, the discharge of the capacitor $C_1$ is accelerated by the capacitor $C_4$ so as to bring about a simultaneous discharge of the thyratron 62. In this way very short exposure times can readily be obtained.

It is pointed out by way of example that, if the capacitor $C_4$ is connected to a material body instead of to the capacitor $C_1$, the discharge currents of the capacitors $C_1$, $C_2$ and $C_3$ would first have to be exhausted before the shutter can be closed.

The auxiliary means for discharging the thyratron 61 after the exposure process has been completed and the auxiliary means for timing a recharging of the capacitors $C_1$ through $C_6$ as well as the structure for holding the mechanical contactor 63 closed during the duration of the exposure time have all been omitted from the circuit diagrams for the purpose of imparting clarity to these diagrams. Further conventional structures can be employed for these functions.

It is pointed out that the thyratrons 61 and 62 which function as contactors in this arrangement may be replaced by other suitable forms of electronic contactors.

Thus it can be seen that the present invention provides a switching arrangement for a pair of electromagnetic circuits wherein the functioning of the first electromagnetic circuit precludes the functioning of the second electromagnetic circuit.

It will be understood that this invention is susceptible to modification in order to adapt it to different usages and conditions, and, accordingly, it is desired to comprehend such modifications within this invention as may fall within the scope of the appended claims.

What I claim is:

1. A switching arrangement for electromagnets and comprising a source of electrical energy, a plurality of magnetic coils corresponding to the electromagnets and connected to said source to form a plurality of magnetic coil circuits, switch means for selectively connecting one of said coil circuits with said source to energize said magnetic coil, a capacitor connected in each coil circuit, and electrical means interconnecting said magnetic coil circuits for producing a deenergization pulse across an energized coil to break down the magnetic field thereof when the respective other magnetic coil circuit is being energized.

2. In a switching arrangement for electromagnets, the combination comprising: an electric voltage source; a first and a second electromagnetic coil, each having first and second terminals; electric circuit means including resistive means for each coil for connecting the first terminal thereof permanently during operation to a voltage source terminal; a capacitor interconnecting said first terminals of said coils; and selective switching means for connecting the second terminal of each coil to the respective other voltage source terminal.

3. In a switching arrangement for electromagnets, the combination comprising: an electric voltage source; a first and a second electromagnetic coil, each having first and second terminals; electric circuit means including resistive means for each coil for connecting the first terminal thereof permanently during operation to a voltage source terminal; a capacitor interconnecting said first terminals of said coils; and selective switching means for connecting the second terminal of each coil to the respective other voltage source terminal; and at least one other capacitor connected across at least one of said coils and switching means.

4. In a switching arrangement for electromagnets, the combination comprising: an electric voltage source having two terminals; a first and a second electromagnetic coil, each having first and second terminals; circuit means for connecting said first terminal of said first coil to one of said voltage source terminals; first switching means for connecting the second terminal of said first coil to the other voltage source terminal; circuit means including resistive means for connecting said first terminal of said second coil to one of said voltage source terminals; second switching means for connecting the second terminal of said second coil to the respective other voltage source terminal; and a capacitor interconnecting said first terminals of said two coils.

5. In a switching arrangement for electromagnets, the combination comprising: an electric voltage source having two terminals; a first and a second electromagnetic coil, each having first and second terminals; circuit means for connecting said first terminal of said first coil to one of said voltage source terminals; first switching means for connecting the second terminal of said first coil to the other voltage source terminal; circuit means including resistive means for connecting said first terminal of said second coil to one of said voltage source terminals; second switching means for connecting the second terminal of said second coil to the respective other voltage source terminal; a capacitor interconnecting said first terminals of said two coils; and a second capacitor connected with one side to said first terminal of said first coil and being conectable to said second terminal thereof via said first switching means.

6. In a switching arrangement for electromagnets, the combination comprising: an electric voltage source having two terminals; a first and a second electromagnetic coil, each having first and second terminals; circuit means for connecting said first terminal of said first coil to one of said voltage source terminals; first switching means for connecting the second terminal of said first coil to the other voltage source terminal; circuit means including resistive means for connecting said first terminal of said second coil to one of said voltage source terminals; second switching means for connecting the second terminal of said second coil to the respective other voltage source terminal; a capacitor interconnecting said first terminals of said two coils; a second capacitor connected with one side to said first terminal of said first coil and being connectable to said second terminal thereof via said first switching means, said capacitors being dimensioned so that upon closing of said second switching means with said first switching means being closed, said second capacitor discharges more rapidly than said first capacitor.

7. In a switching arrangement for electromagnets, the combination comprising: an electric voltage source having two terminals; a first and a second electromagnetic coil, each having first and second terminals; circuit means for connecting said first terminal of said first coil to one of said voltage source terminals; first switching means for connecting the second terminal of said first coil to the other voltage source terminal; circuit means including resistive means for connecting said first terminal of said second coil to one of said voltage source terminals; second switching means for connecting the second terminal of said second coil to the respective other voltage source terminal; a capacitor interconnecting said first terminals of said two coils; a second capacitor connected with one side to said first terminal of said first coil and being connectable to said second terminal thereof via said first switching means; and at least one rectifier connected across at least one of said coils at such a polarity that the voltage drop across the coil when energized biases the rectifier in non-conductive direction.

8. In a switching arrangement for electromagnets, the combination comprising: an electric voltage source having two terminals; a first and a second electromagnetic coil each having first and second terminals; circuit means for connecting said first terminal of said first coil to one of said voltage source terminals; first switching means for connecting the second terminal of said first coil to the other voltage source terminal; circuit means including resistive means for connecting the first terminal of said second coil to one of said voltage source terminals; second switching means for connecting the second terminal of said second coil to the respective other voltage source terminal; a first capacitor interconnecting said first terminals of said coils; a second capacitor connected with one side of said first terminal of said first coil and being connectable to said second terminal thereof via said first switching means.

9. In a switching arrangement for electromagnets, the combination comprising: an electric voltage source, a first and a second electromagnetic coil each having first and second terminals, electric circuit means for each coil for connecting the coils to the voltage source and electrical means interconnecting the first terminals of the coils for producing a negative pulse in an energized coil to break down the magnetic field in this coil when the other coil is energized.

References Cited by the Examiner
UNITED STATES PATENTS

| | | | |
|---|---|---|---|
| 2,960,635 | 11/60 | Confalone | 317—141 X |
| 3,009,082 | 11/61 | Stimler et al. | 317—151 |

SAMUEL BERNSTEIN, *Primary Examiner.*

WALTER L. CARLSON, *Examiner.*